US012803404B2

(12) United States Patent
Kuo et al.

(10) Patent No.: US 12,803,404 B2
(45) Date of Patent: Nov. 17, 2026

(54) SINGLE-PHASE MOTOR WITH POSITIVE AND NEGATIVE TURN DETECTION

(71) Applicants: CHAMP TECH OPTICAL (FOSHAN) CORPORATION, Foshan (CN); Foxconn Technology Co., Ltd., New Taipei (TW)

(72) Inventors: Po-Tsun Kuo, New Taipei (TW); Kuan-Ming Wang, New Taipei (TW); Kun-Che Lee, Foshan (CN); Yung-Ping Lin, New Taipei (TW)

(73) Assignees: CHAMP TECH OPTICAL (FOSHAN) CORPORATION, Foshan (CN); Foxconn Technology Co., Ltd., New Taipei (TW)

( * ) Notice: Subject to any disclaimer, the term of this patent is extended or adjusted under 35 U.S.C. 154(b) by 212 days.

(21) Appl. No.: 18/673,283

(22) Filed: May 23, 2024

(65) Prior Publication Data

US 2025/0192656 A1 Jun. 12, 2025

(30) Foreign Application Priority Data

Dec. 12, 2023 (CN) ......................... 202311711617.X

(51) Int. Cl.

*H02P 6/26* (2016.01)
*G01D 5/245* (2006.01)
*H02K 29/08* (2006.01)
*H02P 6/30* (2016.01)

(52) U.S. Cl.

CPC ........... *H02K 29/08* (2013.01); *G01D 5/2452* (2013.01); *G01D 2205/26* (2021.05); *G01D 2205/85* (2021.05)

(58) Field of Classification Search

CPC ... H02P 6/26; H02P 6/30; G01P 13/04; H02K 29/08; G01D 5/2452; G01D 2205/85; G01D 2205/26

See application file for complete search history.

(56) References Cited

U.S. PATENT DOCUMENTS 4,365,187 A * 12/1982 McDaniel .............. H02K 29/08 318/400.41
7,940,022 B2 * 5/2011 Wei ....................... H02P 25/092 318/474
7,944,162 B2 * 5/2011 Chiu ......................... H02P 6/15 318/449

(Continued)

*Primary Examiner* — Burton S Mullins
(74) *Attorney, Agent, or Firm* — ScienBiziP, P.C.

(57) ABSTRACT

A single-phase motor with positive and negative turn detection, including a rotor assembly, a master hall element, a secondary hall element, and a control assembly. The rotor assembly includes a magnetic ring and a permanent magnet. The magnetic ring includes magnetic strips that are connected end to end. The permanent magnet includes a plurality of magnetic ends. The master hall element is located at a lead position of the permanent magnet. A jitter point is defined between one magnetic end corresponding to the master hall element and one magnetic end adjacent to the master hall element in the clockwise direction. The secondary hall element is located on a side facing the counter clockwise direction of the master hall element. A first angle between the secondary hall element and the master hall element is greater than a second angle between the jitter point and the lead position.

13 Claims, 8 Drawing Sheets

100

(56) References Cited

U.S. PATENT DOCUMENTS

| | | | | |
|---|---|---|---|---|
| 8,324,849 | B2 * | 12/2012 | Kuo | H02P 7/29<br>318/400.14 |
| 10,164,554 | B2 * | 12/2018 | Chu | H02K 11/33 |
| 2012/0049698 | A1 * | 3/2012 | Horng | H02P 6/26<br>310/68 B |
| 2018/0138848 | A1 * | 5/2018 | Sun | H02P 6/30 |
| 2018/0309396 | A1 * | 10/2018 | Hardt | H02P 27/08 |

* cited by examiner

SINGLE-PHASE MOTOR WITH POSITIVE AND NEGATIVE TURN DETECTION

FIELD

The present disclosure relates to field of motor technology, and in particular to a single-phase motor with positive and negative turn detection.

BACKGROUND

When a single-phase brushless Direct Current (DC) motor is working, the higher a speed of the single-phase brushless DC motor, the larger a back electromotive force of the single-phase brushless DC motor and the more a current of the single-phase brushless DC motor will lag behind a voltage output, resulting in backward warping of a current wave mode, thus making a efficiency of the single-phase brushless DC motor worse and a vibration noise of the single-phase brushless DC motor greater. In order to avoid a backward warping of a current curve of the single-phase brushless DC motors, existing single-phase brushless DC motors place a hall element in a leading position to sense a pole change of a rotor assembly of the single-phase brushless DC motor in advance. When the single-phase brushless DC motor starts, the hall element in the leading position will cause a dead angle jitter phenomenon of the single-phase brushless DC motors, which makes a control device of the single-phase brushless DC motors mistakenly determine that the single-phase brushless DC motors are working normally. As a result, the single-phase brushless DC motor will continue to increase the power and cause internal components of the single-phase brushless DC motor to be overloaded and damaged.

Thus, there is room for improvement within the art.

BRIEF DESCRIPTION OF THE DRAWINGS

Many aspects of the disclosure can be better understood with reference to the following drawings. The assemblies in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of the embodiments described herein.

Several definitions that apply throughout this disclosure will now be presented.

The term "coupled" is defined as coupled, whether directly or indirectly through intervening assemblies, and is not necessarily limited to physical connections. The connection may be such that the objects are permanently coupled or releasably coupled. The term "substantially" is defined to be essentially conforming to the particular dimension, shape, or other feature that the term modifies, such that the assembly need not have that exact feature. The term "comprising," when utilized, means "including, but not necessarily limited to"; it specifically indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein includes any and all combinations of one or more of associated listed items.

Figure 1:
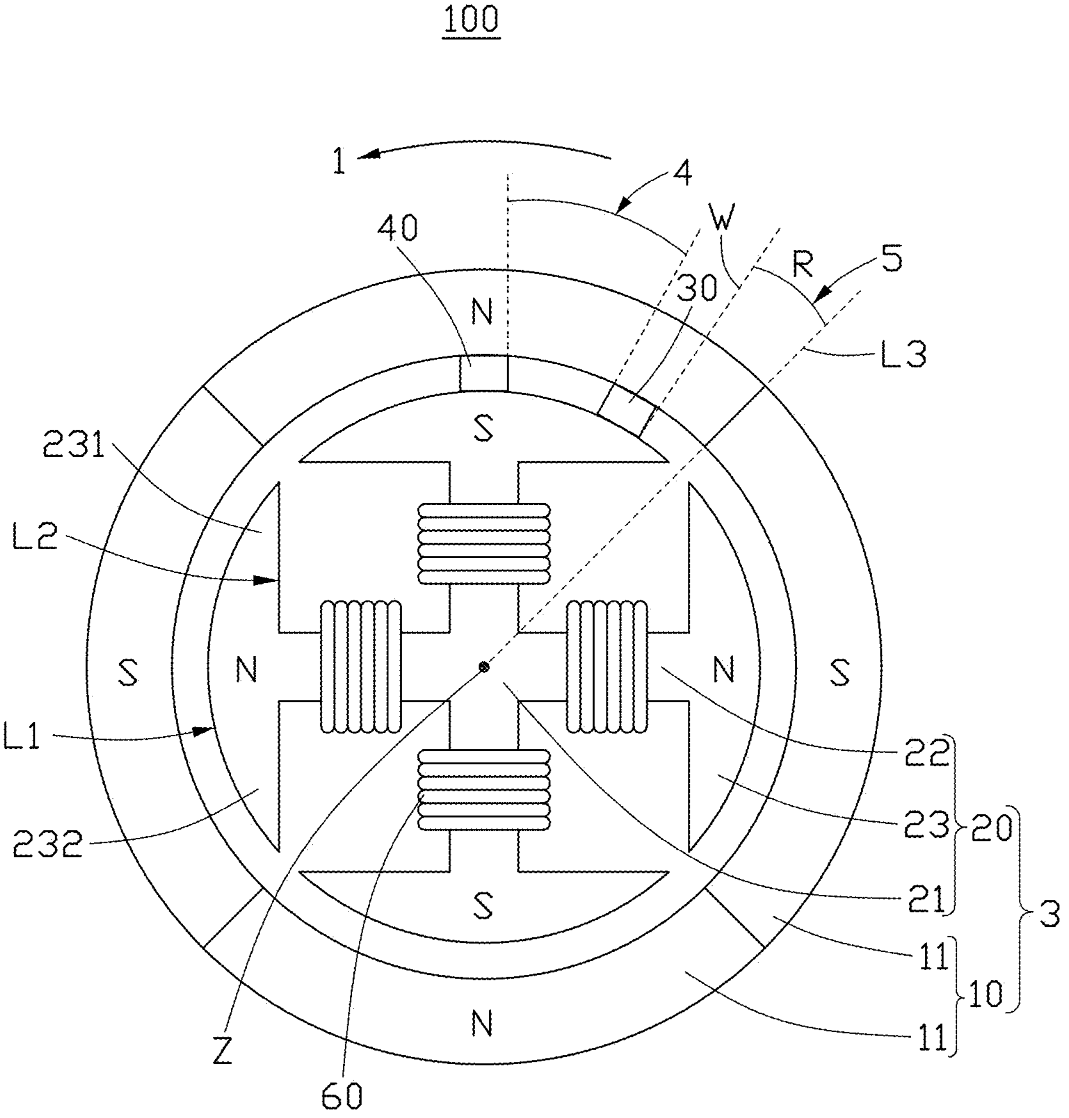
FIG. 1 shows a schematic diagram of a single-phase motor with positive and negative turn detection of a present application in an embodiment, wherein a magnetic ring rotates in a counter clockwise direction.
Figure 2:
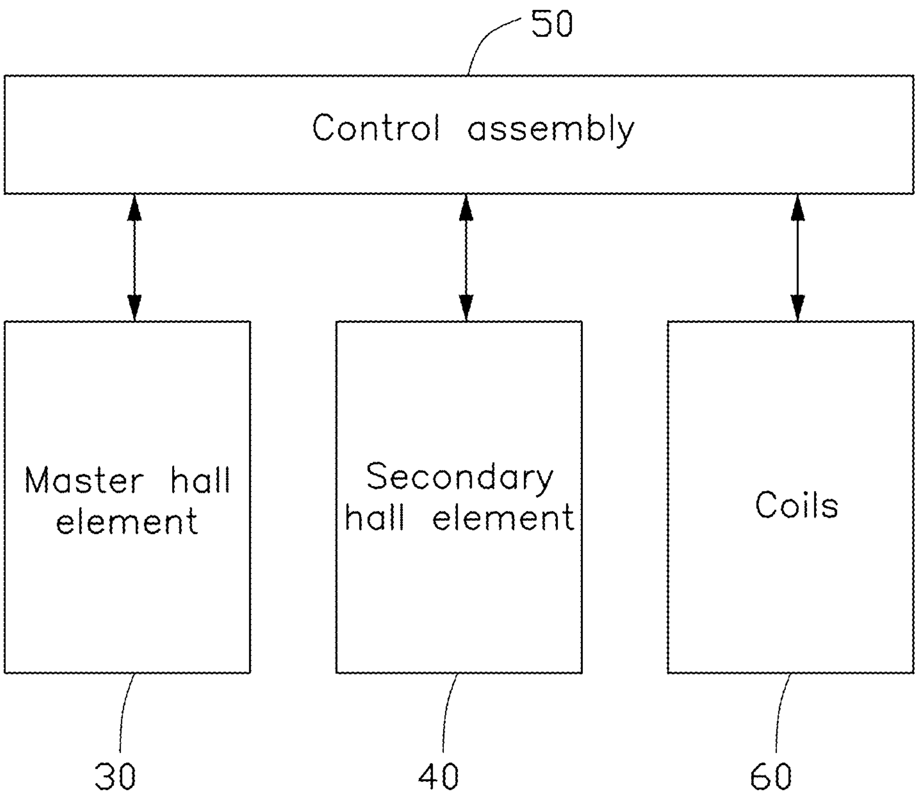
FIG. 2 shows a schematic diagram of a signal transmission of a single-phase motor with positive and negative turn detection of a present application in an embodiment.
Figure 3:
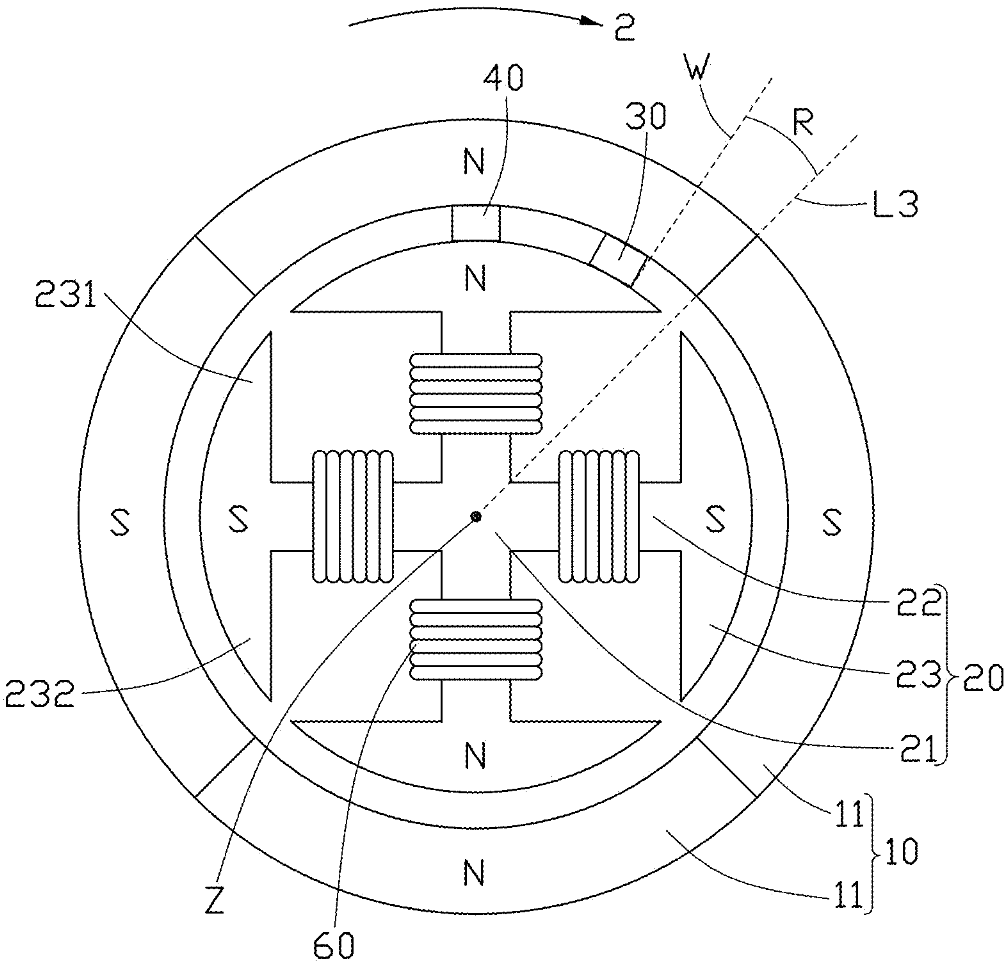
FIG. 3 shows a schematic diagram of a single-phase motor with positive and negative turn detection of a present application in an embodiment, wherein a magnetic ring rotates in a clockwise direction.

Referring to FIG. 1 to FIG. 3, in one embodiment, the single-phase motor with positive and negative turn detection 100 includes a stator 20, a rotor assembly 3, a master hall element 30, a secondary hall element 40, and a control assembly 50.

The rotor assembly 3 has a central axis Z, and the rotor assembly 3 includes a magnetic ring 10. The magnetic ring 10 is circular, and a center point of the magnetic ring 10 coincides with the central axis Z. The magnetic ring 10 is capable of being rotated around the central axis Z in a clockwise direction 2 or a counter clockwise direction 1. The magnetic ring 10 is arranged outside the stator 20, and the magnetic ring 10 is located in a magnetic field of the stator 20. The magnetic ring 10 includes rotor sections 11, the magnetic strips rotor sections 11 are connected end to end and arranged around the central axis Z. Magnetic poles of any two adjacent rotor sections 11 are opposite. The stator 20 includes a plurality of stator magnetic ends 23, the plurality of stator magnetic ends 23 are arranged around the central axis Z, and the plurality of stator magnetic ends 23 are arranged one-to-one corresponding to the rotor sections 11.

The master hall element 30 is provided at the plurality of the stator magnetic ends 23, and the master hall element 30 is located at a leading position W of the stator 20. When the magnetic ring 10 rotates in the clockwise direction 2, a position where the master hall element 30 can sense a polarity change of the magnetic ring 10 in advance is the leading position W. A jitter point is defined between one of the stator magnetic ends 23 corresponding to the master hall element 30 and one of the stator magnetic ends 23 adjacent to the master hall element 30 along the clockwise direction 2. The secondary hall element 40 is arranged on the one of the stator magnetic ends 23 corresponding to the master hall element 30, and the secondary hall element 40 is located on a side of the master hall element 30 facing the counter clockwise direction 1. A first angle 4 defined between the secondary hall element 40 and the master hall element 30 is greater than a second angle 5 defined between the jitter point and the leading position W. The control assembly 50 signal connects the master hall element 30 and the secondary hall element 40, and the control assembly 50 compares polarities of the rotor sections 11 detected by the master hall element 30 and the secondary hall component 40.

It should be noted that the above master hall element 30 and the secondary hall component 40 are located on the plurality of stator magnetic ends 23, which only indicates positions of the master hall element 30 and the secondary hall component 40 relative to the plurality of stator magnetic ends 23, and the master hall element 30 and the secondary hall component 40 are not necessarily fixed on the plurality of stator magnetic ends 23, they can also be fixed on other components outside the plurality of stator magnetic ends 23. Only ensure that positions of the plurality of stator magnetic ends 23 relative to the master hall element 30 and the secondary hall component 40 are as described above.

Thus, in the single-phase motor with positive and negative turn detection 100 of this application, the master hall element 30 is set at the leading position W of the stator 20, so that when the magnetic ring 10 rotates in the clockwise direction 2, the master hall element 30 can sense a polarity change of the magnetic ring 10 in advance. Furthermore, the secondary hall element 40 is arranged on one of the plurality of stator magnetic ends 23 corresponding to the master hall element 30, and the secondary hall element 40 is located on a side of the master hall element 30 facing the counter clockwise direction 1. In addition, the first angle 4 defined between the secondary hall element 40 and the master hall element 30 is greater than the second angle 5 defined between the jitter point and the leading position W, so as to distinguish polarity changes of the rotor sections 11 detected by the secondary hall element 40 and the master hall element 30, and then the control assembly 50 compares polarities of the rotor sections 11 detected by the master hall element 30 and the secondary hall element 40. Then, according to above comparison results, it is timely to determine whether the single-phase motor with positive and negative turn detection 100 has a dead angle jitter phenomenon, which is convenient to take timely measures to protect the single-phase motor with positive and negative turn detection 100 to avoid damage caused by overload caused by continuous current rise.

Referring to FIG. 1 to FIG. 3, in one embodiment, the stator 20 is made of a magnetic material such as silicon steel sheet. The stator 20 includes a main body part 21 and four connecting parts 22. The main body part 21 is rectangular, the four connecting parts 22 are long strips, and one end of each of the four connecting parts 22 is connected to a periphery of the main body part 21. The four connecting parts 22 are equidistant around the central axis Z, and an angle defined between any two adjacent connecting parts 22 is 90°.

The four stator magnetic ends 23 correspond to the four connecting parts 22, and each of the four stator magnetic ends 23 is respectively connected to an end of each of the four connecting parts 22 away from the main body part 21. The main body part 21, the four connecting parts 22, and the four stator magnetic ends 23 are connected in one body.

The stator magnetic end 23 is fan-shaped, and the stator magnetic end 23 includes a curved edge L1 and a straight edge L2. Two ends of the curved edge L1 are respectively connected to two ends of the straight edge L2 to enclose the stator magnetic end 23. An angle of an arc center angle corresponding to the curved edge L1 is less than 90°, so that a gap is defined between the two adjacent stator magnetic ends 23, and the jitter point is located in the gap.

The magnetic ring 10 is arranged at intervals around the stator 20, and the number of rotor sections 11 is set to four. The four rotor sections 11 correspond to the four stator magnetic ends 23, each of the rotor sections 11 is arc shaped and its arc center angle is 90°. The arc center angle of each of the magnetic strip 11 is greater than an arc center angle of each of the plurality of stator magnetic ends 23, so that each of the rotor sections 11 can completely cover each of the plurality of stator magnetic end 23.

In other embodiments, the number of the connection parts 22, the stator magnetic ends 23, and the rotor sections 11 can also be six or eight, and a specific number can be selected according to an actual design needs.

Referring to FIG. 1 to FIG. 3, in one embodiment, the single-phase motor with positive and negative turn detection 100 further includes a plurality of coils 60, the plurality of coils 60 are arranged corresponding to a plurality of connection parts 22, and each of the plurality of coils 60 is wound around an outer perimeter of each of the plurality of the connection parts 22. When one of the plurality of the coils 60 is energized, the one of the plurality of coils 60 polarizes the one of the plurality of stator magnetic ends 23 corresponding to the one of the plurality of coils 60.

Furthermore, polarities of any two adjacent stator magnetic ends 23 are opposite, and polarities of any two adjacent rotor sections 11 are opposite. When one of the stator magnetic ends 23 is of a same polarity as one of the rotor sections 11 located on a side of the one of the plurality of the stator magnetic ends 23 away from the central axis Z, the rotor assembly 3 rotates in the clockwise direction 2. When one of the stator magnetic ends 23 is of a opposite polarity to one of the rotor sections 11 located on a side of the one of the plurality of the stator magnetic ends 23 away from the central axis Z, the rotor assembly 3 rotates in the counter clockwise direction 1.

Thus, when a polarity of one of stator magnetic ends 23 corresponding to one of the rotor sections 11 is the same as a polarity of the one of the rotor sections 11, there will be a repulsive force between the magnetic strip 11 and the stator magnetic end 23, and the repulsive force causes the magnetic ring 10 to rotate in the counter clockwise direction 1. When a polarity of one of stator magnetic ends 23 corresponding to one of the rotor sections 11 is opposite to a polarity of the one of the rotor sections 11, there will be an attracting force between the magnetic strip 11 and the stator magnetic end 23, and the attracting force causes the magnetic ring 10 to rotate in the clockwise direction 2.

Referring to FIG. 1 to FIG. 3, in one embodiment, along an extension direction of the curved edge L1, one of the stator magnetic ends 23 includes a first end part 231, and a second end part 232. The second end part 232 is connected to a side of the first end part 231 towards the counter clockwise direction 1. A thickness of the first end part 231 is greater than a thickness of the second end part 232, and a distance between the stator magnetic end 23 and the central axis Z decreases from the first end part 231 to the second end part 232. A distance between the first end part 231 and the magnetic ring 10 is smaller than a distance between the second end part 232 and the magnetic ring 10, so that a magnetic force between the first end part 231 and the magnetic ring 10 is greater than a magnetic force between the second end part 232 and the magnetic ring 10. When a polarity of one of t the stator magnetic ends 23 is the same as a polarity of the corresponding magnetic strip 11, the magnetic ring 10 is more easily rotated in the counter clockwise direction 1. The master hall element 30 is arranged on the first end part 231. In an initial state, when a polarity of one of the stator magnetic ends 23 is the same as a polarity of the corresponding magnetic strip 11, the magnetic ring 10 rotates in the counter clockwise direction 1, which causes the magnetic strip 11 corresponding to the master hall element 30 to change, so that the master hall element 30 picks up a polarity of the other magnetic strip 11 more quickly.

Referring to FIG. 1 to FIG. 3, in one embodiment, the control assembly 50 collects a first signal and a second signal. When two adjacent rotor sections 11 undergo pole change and pass by the master hall element 30, the first signal is set as polarity signals of the two adjacent rotor sections 11 detected by the master hall element 30. When two adjacent rotor sections 11 undergo pole change and pass by the secondary hall element 40, the second signal is set as a polarity signals of the two adjacent rotor sections 11 detected by the secondary hall element 40. The control assembly 50 compares the first signal with the second signal to determine a rotation direction of the rotor assembly 3.

In one embodiment, if the first signal is the same as the second signal, the control assembly 50 determines the rotor assembly 3 rotates in the clockwise direction 2. If the first signal is different from the second signal, the control assembly 50 determines the rotor assembly 3 rotates in the counter clockwise direction 1.

Referring to FIG. 1 and FIG. 2, a top stator magnetic end 23 of the plurality of the stator magnetic ends 23 is an S pole, and the top magnetic strip 11 is an N pole. The master hall element 30 detects one of the rotor sections 11 corresponding to the master hall element 30 as an N pole. When the magnetic ring 10 is affected by an anomaly, such as a system return air, which causes the magnetic ring 10 to rotate at an angle in the counter clockwise direction 1, the angle is smaller than an angle between the secondary hall element 40 and the master hall element 30. In this case, the master hall element 30 will detect that the corresponding magnetic strip 11 changes to the S pole, so that the first signal is output from the master hall element 30 to the control assembly 50, while the secondary hall element 40 is located in front of the master hall element 30 in the counter clockwise direction 1, so that the magnetic strip 11 induced by the secondary hall element 40 is still the N pole. The secondary hall element 40 outputs a second signal to the control assembly 50. A polarity of the first signal is opposite to a polarity of the second signal, at this time, the rotor assembly 3 is rotated in the counter clockwise direction 1.

Accordingly, from the above description, when one of the stator magnetic ends 23 at a top of the figure is the N pole, and one of the rotor sections 11 at a top of the figure is the S pole, the master hall element 30 detects that its corresponding magnetic strip 11 is the S pole. When the magnetic ring 10 is affected by an anomaly, such as a system return air, which causes the magnetic ring 10 to rotate at an angle in the counter clockwise direction 1, the angle is smaller than an angle between the secondary hall element 40 and the master hall element 30. In this case, the master hall element 30 will detect that the corresponding magnetic strip 11 changes to the N pole, so that the first signal is output from the master hall element 30 to the control assembly 50, while the secondary hall element 40 is located in front of the master hall element 30 in the counter clockwise direction 1, so that one of the rotor sections 11 induced by the secondary hall element 40 is still the S pole. The secondary hall element 40 outputs a second signal to the control assembly 50. A polarity of the first signal is opposite to a polarity of the second signal, at this time, the rotor assembly 3 is rotated in the counter clockwise direction 1.

Referring to FIG. 3 and FIG. 2, one of the stator magnetic ends 23 at a top of the figure is N pole, and one of the rotor sections 11 at a top of the figure is N pole, the master hall element 30 detects that its corresponding magnetic strip 11 is the pole N. When the magnetic ring 10 rotates at a certain angle along the clockwise direction 2, the certain angle is small so that one of the rotor sections 11 corresponding to the secondary hall element 40 and one of the rotor sections 11 corresponding to the master hall element 30 will not change, then the master hall element 30 will detect the corresponding magnetic strip 11 is still the N pole, and the master hall element 30 will output the first signal to the control assembly 50. The secondary hall element 40 detects that the corresponding magnetic strip 11 is still the N pole, and the secondary hall element 40 outputs the second signal to the control assembly 50. A polarity of the first signal is the same as a polarity of the second signal. At this time, the rotor assembly 3 rotates in the clockwise direction 2.

Accordingly, from the above description, one of the stator magnetic ends 23 at a top of the figure is S pole, and one of the rotor sections 11 at a top of the figure is the S pole, the master hall element 30 detects that its corresponding magnetic strip 11 is the pole S. When the magnetic ring 10 rotates at a certain angle along the clockwise direction 2, the certain angle is small so that one of the rotor sections 11 corresponding to the secondary hall element 40 and one of the rotor sections 11 corresponding to the master hall element 30 will not change, then the master hall element 30 will detect the corresponding magnetic strip 11 is still the S pole, and the master hall element 30 will output the first signal to the control assembly 50. The secondary hall element 40 detects that the corresponding magnetic strip 11 is still the S pole, and the secondary hall element 40 outputs the second signal to the control assembly 50. A polarity of the first signal is the same as a polarity of the second signal. At this time, the rotor assembly 3 rotates in the clockwise direction 2.

Referring to FIG. 1 to FIG. 3, in an embodiment, the stator 20 further includes a center line L3 set as an angular bisector of an arc center angle of two adjacent stator magnetic ends 23 of the plurality of the stator magnetic ends 23. The leading position W is located on one of the plurality of the stator magnetic ends 23 adjacent to the center line L3, and the leading position W is located on a side of the center line L3 toward the counter clockwise direction 1. The rotor assembly 3 further includes a jitter dead angle R, the jitter dead angle R is set as an angle between the center line L3 and the leading position W, and the jitter point coincides with the center line L3. The jitter dead angle R is actually the second angle 5 mentioned above.

Figure 4:
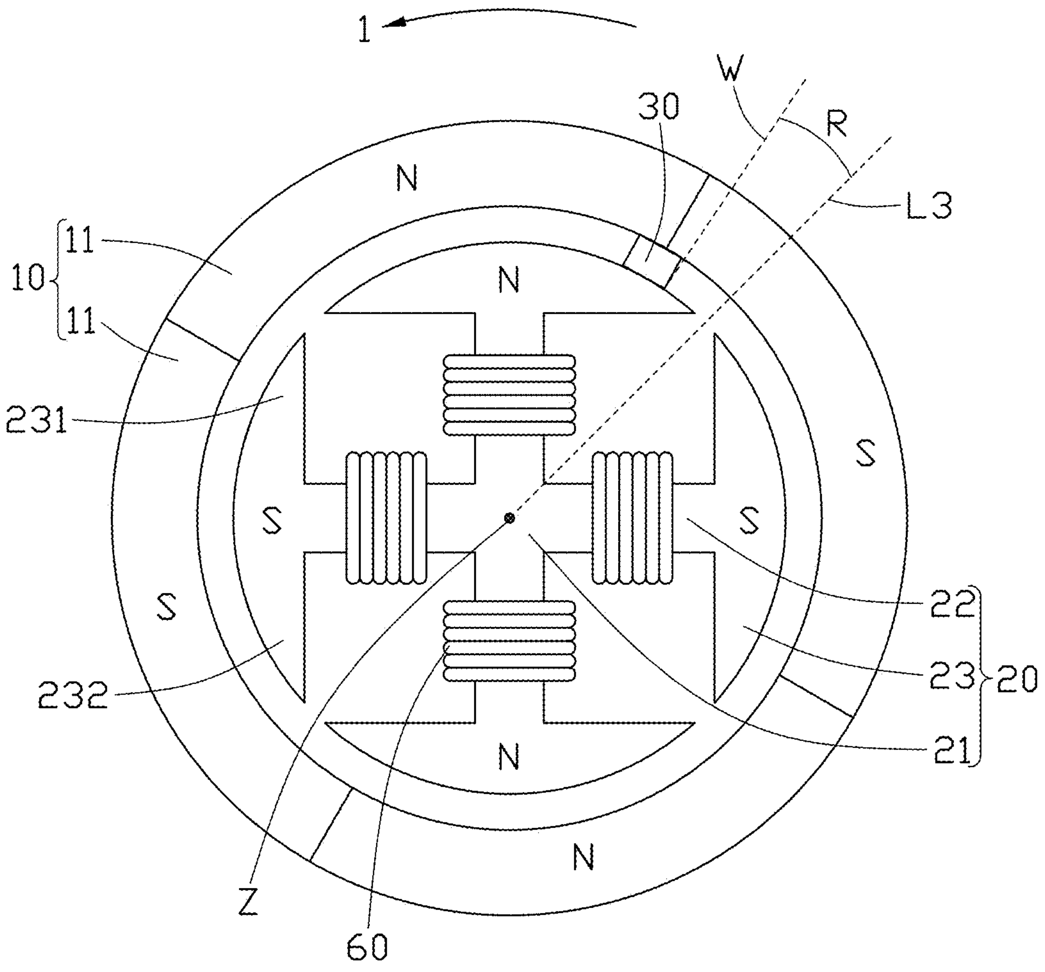
FIG. 4 shows a schematic diagram of a single-phase motor with positive and negative turn detection of a present application in an embodiment without a secondary hall element, wherein a magnetic ring rotates in a counter clockwise direction.
Figure 5:
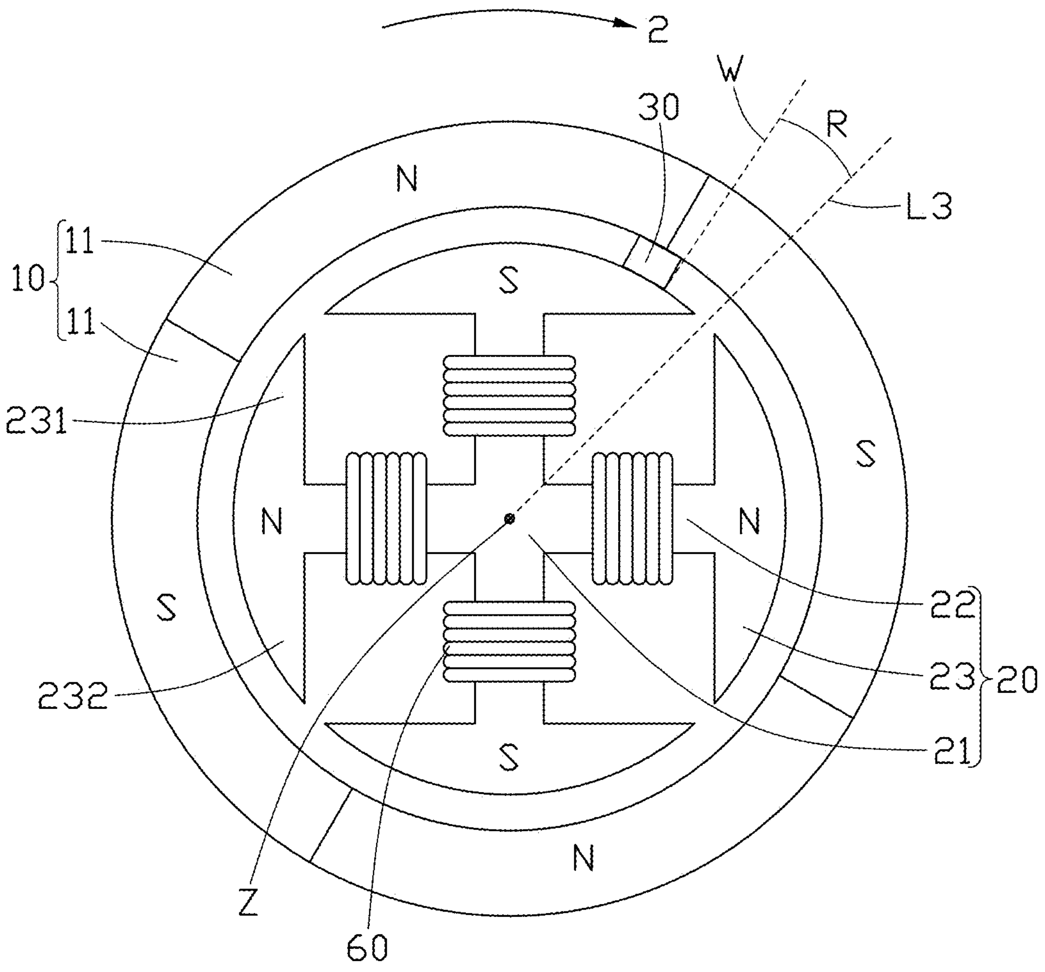
FIG. 5 shows a schematic diagram of a single-phase motor with positive and negative turn detection of a present application in an embodiment without a secondary hall element, wherein a magnetic ring rotates in a clockwise direction.

In one embodiment, in order to better explain a relationship between a setting of the leading position W and a starting of a dead angle jitter of the rotation structure of single phase motor 100, FIG. 4 and FIG. 5 are taken as examples.

When the single-phase motor with positive and negative turn detection 100 is at rest or in a first magnetization state, one of the rotor sections 11 at a top of the above figure is N pole, and the master hall element 30 detects that its corresponding magnetic strip 11 is the N pole. The master hall element 30 feeds back a signal to the control assembly 50, which adjusts a current flow of one of the plurality of the coils 60 so that one of the plurality of the stator magnetic ends 23 at a top of the figure is still the N pole. At this time, the magnetic ring 10 rotates at a certain angle along the counter clockwise direction 1, and a rotation angle of the magnetic ring 10 is less than the jitter dead angle R, that is, the magnetic ring 10 rotates to a state shown in FIG. 4. When the master hall element 30 detects that its corresponding magnetic strip 11 is still the N pole, and a polarity of one of the stator magnetic ends 23 is the same as a polarity of one of the rotor sections 11, the magnetic ring 10 will continue to rotate in the counter clockwise direction 1.

When the magnetic ring 10 continues to rotate until its rotation angle is greater than the jitter dead angle R, the master hall element 30 detects that its corresponding magnetic strip 11 is S pole, and the master hall element 30 gives a feedback signal to the control assembly 50, which adjusts a current flow direction of one of the plurality of the coils 60, so that the top stator magnetic end 23 is adjusted to the N pole, which is a state shown in FIG. 5. At this time, since most parts of one of the plurality of the stator magnetic ends 23 of the top S pole corresponds to one of the rotor sections 11 of the N pole, and a small part corresponds to the magnetic strip 11 of the S pole, a magnetic force of attraction between the magnetic ring 10 and the stator 20 is greater than a magnetic force of repulsion between the magnetic ring 10 and the stator 20, then the magnetic ring 10 will rotate along the clockwise direction 2. When the magnetic ring 10 rotates along the clockwise direction 2 to a certain angle, the master hall element 30 detects that its corresponding magnetic strip 11 becomes the N pole again, the master hall element 30 feeds back a signal to the control assembly 50, and the control assembly 50 adjusts a current flow direction of one of the plurality of the coils 60, so that one of the plurality of the stator magnetic ends 23 at the top is adjusted to the N pole, that is, the single-phase motor with positive and negative turn detection 100 is again in a static state or a first magnetron state, and the single-phase motor with positive and negative turn detection 100 continues to repeat above actions. As a result, the single-phase motor with positive and negative turn detection 100 appears a jitter phenomenon, this jitter phenomenon will make the control assembly 50 think that it is a normal steering switch, resulting in continuous increase of current, which causes components to be overloaded and damaged.

In one embodiment, the control assembly 50 further collects a third signal and a fourth signal. When the single-phase motor with positive and negative turn detection 100 is started in the jitter dead angle R, the third signal is set as a polarity of one of the rotor sections 11 detected by the master hall element 30, and the fourth signal is set as a polarity of one of the rotor sections 11 detected by the secondary hall element 40. The control assembly 50 compares the third signal and the fourth signal to determine a working state of the single-phase motor with positive and negative turn detection 100.

Furthermore, the control assembly 50 compares the third signal and the fourth signal, if the polarity of the magnetic strip 11 in the third signal is alternately changed, and the polarity of the magnetic strip 11 in the fourth signal remains unchanged, the single-phase motor with positive and negative turn detection 100 is abnormally jitter. At this time, the control assembly 50 adjusts the coil current to avoid occurrences of component overload.

If the polarity of the magnetic strip 11 in the third signal is alternately changed, and the polarity of the magnetic strip 11 in the fourth signal is alternately changed, the control assembly 50 detects the single-phase motor with positive and negative turn detection 100 works normally.

Figure 6:
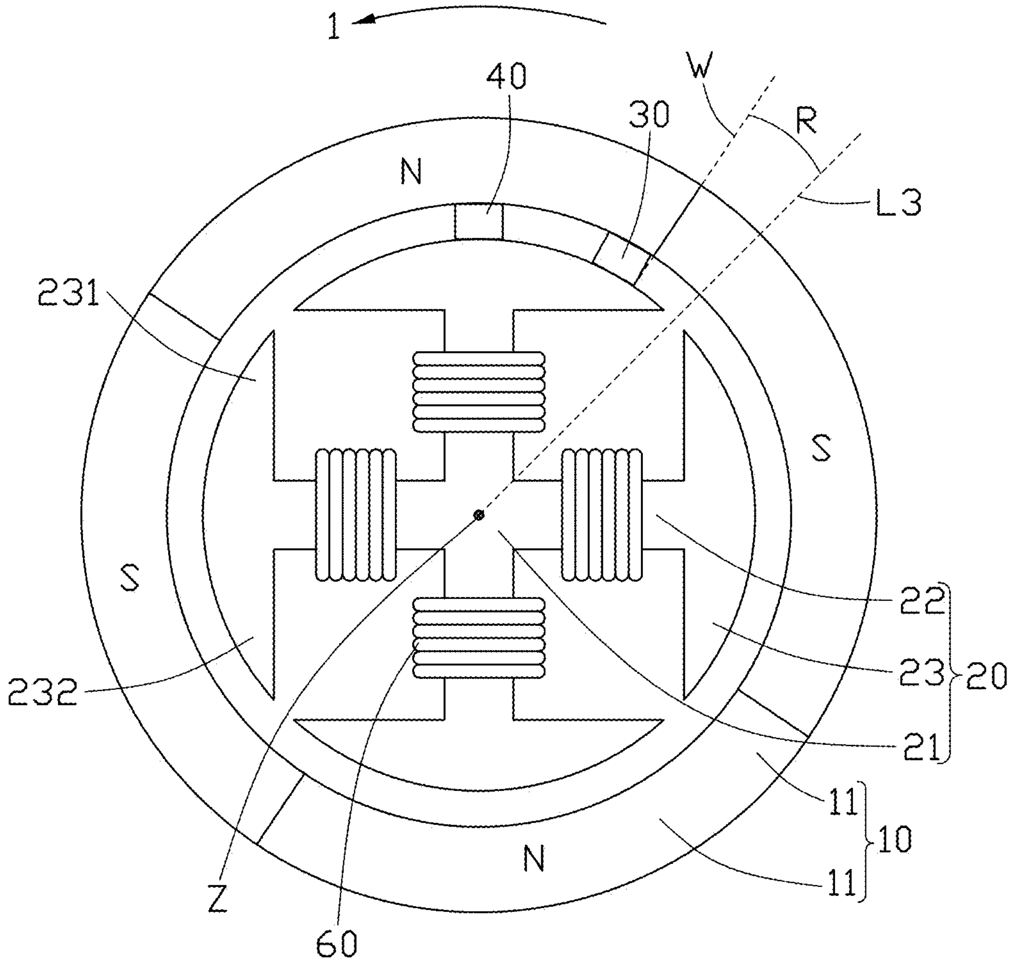
FIG. 6 shows a schematic diagram of the single-phase motor with positive and negative turn detection in FIG. 1 in another state in one embodiment.
Figure 7:
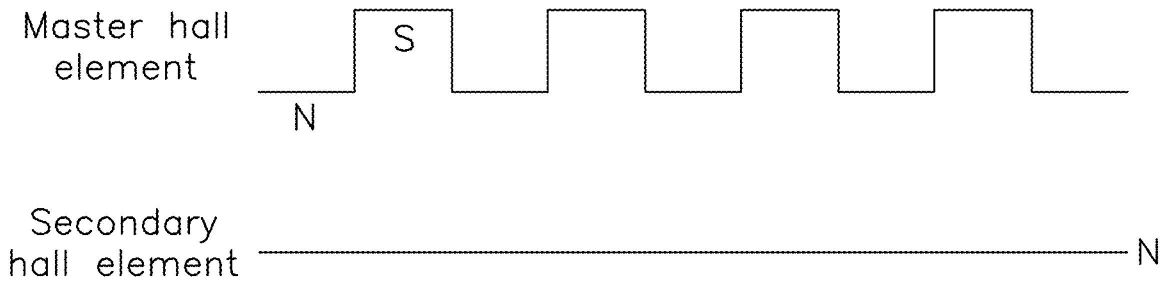
FIG. 7 shows a waveform diagram of detection signals of a master hall element and a secondary hall element when the single-phase motor with positive and negative turn detection in FIG. 6 is in abnormal jitter in one embodiment.

Details are shown in FIG. 6, and referring to FIG. 4 and FIG. 5, as well as the description of the action state in FIG. 4. When the single-phase motor with positive and negative turn detection 100 is at rest or in the first magnetization state, one of the rotor sections 11 at a top of the figure is the N pole, the master hall element 30 detects that its corresponding magnetic strip 11 is the N pole, and the secondary hall element 40 detects that its corresponding magnetic strip 11 is still the N pole. When the single-phase motor with positive and negative turn detection 100 occurs abnormal jitter as mentioned above, the magnetic ring 10 rotates reciprocating within a range of the jitter dead angle R, resulting in a polarity of one of the rotor sections 11 detected by the master hall element 30 from the N pole to the S pole, and then the polarity of the one of the rotor sections 11 detected by the master hall element 30 from the S pole to the N pole, and continue to repeat above changes. A rotation angle of the magnetic ring 10 is within the jitter dead angle R, resulting in the secondary hall element 40 consistently detects the same magnetic strip 11 always, that is, when the single-phase motor with positive and negative turn detection 100 is at rest or in the first magnetization state, the same magnetic strip 11 is the N pole magnetic strip 11 located at a top of the figure. Thus, a signal diagram shown in FIG. 7 is obtained after continuously collecting signals monitored by the master hall element 30 and the secondary hall element 40. In FIG. 7, a peak value of a waveform map corresponds to the S pole signal, and a valley value of the waveform map corresponds to the N pole signal.

Figure 8:
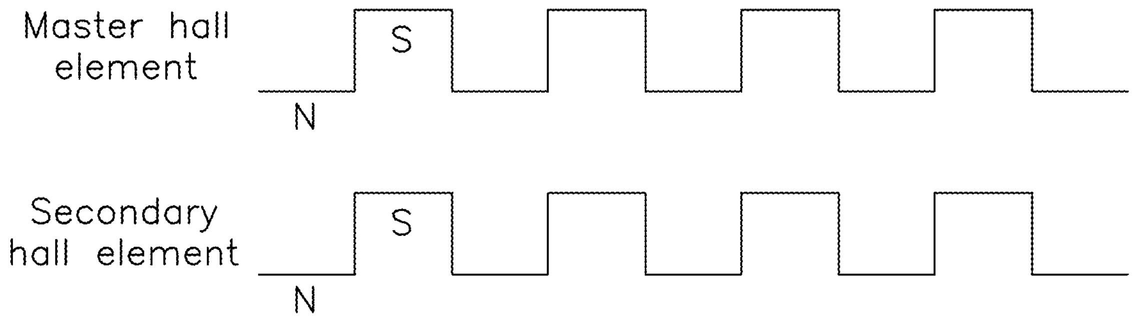
FIG. 8 shows a waveform diagram of detection signals of a master hall element and a secondary hall element when the single-phase motor with positive and negative turn detection in FIG. 6 is in normal rotation in one embodiment.

Details are shown in FIG. 6, and referring to FIG. 4 and FIG. 5, as well as the description of the action state in FIG. 4. When the single-phase motor with positive and negative turn detection 100 is at rest or in the first magnetization state, one of the rotor sections 11 at a top of the figure is the N pole, the master hall element 30 detects that its corresponding magnetic strip 11 is the N pole, and the secondary hall element 40 detects that its corresponding magnetic strip 11 is still the N pole. When the single-phase motor with positive and negative turn detection 100 rotates normally along the counter clockwise direction 1, that is, a rotation angle along the counter clockwise direction 1 is greater than the jitter dead angle R, the N pole magnetic strip 11 at the top of the figure becomes the adjacent S pole magnetic strip 11, and both the master hall element 30 and the secondary hall element 40 detect that magnetisms of the rotor sections 11 change to the S pole. The secondary hall element 40 is in front of the master hall element 30, and the master hall element 30 detects a magnetic change from the N pole to the S pole of one of the rotor sections 11 before the secondary hall element 40. In addition, when the magnetic ring 10 continues to rotate in the counter clockwise direction 1, the S pole magnetic strip 11 at the top becomes the N pole magnetic strip 11 adjacent to it. Both the master hall element 30 and the secondary hall element 40 detect that the rotor sections 11 become the N pole, so a signal schematic diagram shown in FIG. 8 is obtained after signals monitored by the master hall element 30 and the secondary hall element 40 are continuously collected. In FIG. 8, a peak value of a waveform diagram corresponds to the S pole signal, and a valley value of the waveform diagram corresponds to the N pole signal.

The control assembly 50 can determine whether the single-phase motor with positive and negative turn detection 100 is in abnormal jitter or normal working condition according to the signal diagram of a polarity change of the magnetic strip 11. When the single-phase motor with positive and negative turn detection 100 is in abnormal jitter state, measures can be taken in time to protect the single-phase motor with positive and negative turn detection 100.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A single-phase motor with positive and negative turn detection, comprising:

a stator;

a rotor assembly defining a central axis, and comprising a magnetic ring;

wherein, the magnetic ring rotates around the central axis in a clockwise direction or a counter clockwise direction, the magnetic ring is arranged outside the stator, the magnetic ring comprises rotor sections, the rotor sections are end to end connected to each other and arranged around the central axis, and magnetic poles of any adjacent two rotor sections of the rotor sections are opposite;

wherein, the stator comprises a plurality of stator magnetic ends, the plurality of stator magnetic ends are arranged around the central axis, and a number of the plurality of stator magnetic ends is same as a number of the rotor sections;

the single-phase motor with positive and negative turn detection further comprising a master hall element, a secondary hall element, and a control assembly, wherein the master hall element is connected to one of the plurality of the stator magnetic ends, and the master hall element is located at a leading position of the stator, wherein in response to the magnetic ring rotating along the clockwise direction, the master hall element at the leading position is configured to detect a polarity change of the magnetic ring before the secondary hall element detects a polarity change of the magnetic ring, a jitter point is defined between a corresponding stator magnetic end of the plurality of stator magnetic ends corresponding to the master hall element and an adjacent stator magnetic end of the plurality of stator magnetic ends adjacent to the corresponding stator magnetic end in the clockwise direction;

the secondary hall element is arranged on the corresponding stator magnetic end, and on a side facing the counter clockwise direction of the master hall element;

a first angle between the secondary hall element and the master hall element is greater than a second angle between the jitter point and the leading position; and the single-phase motor with positive and negative turn detection further comprising a control assembly via wireless signals, the control assembly is signal connected to the master hall element and the secondary hall element, and the control assembly compares a polarity of the rotor sections detected by the master hall element and a polarity of the secondary hall element, wherein the stator defines a center line, the center line is an angular bisector of an arc center angle of two adjacent stator magnetic ends of the plurality of the stator magnetic ends, the jitter point coincides with the center line; the master hall element at the leading position is arranged on one of the plurality of the stator magnetic ends adjacent to the center line, and on a side of the center line toward the counter clockwise direction of the magnetic ring; the rotor assembly further defines a jitter dead angle between the center line and the leading position; wherein in a case that the single-phase motor starts in the jitter dead angle, the control assembly receives a third signal and a fourth signal, and the control assembly further compares the third signal and the fourth signal to determine a working state of the single-phase motor.

2. The single-phase motor with positive and negative turn detection as claimed in claim 1, wherein, the control assembly receives a first signal and a second signal; when two adjacent rotor sections in the magnetic ring change polarities and pass by the master hall element, wherein when the rotor section undergoes polarity reversal at the main hall element, a polarity signal detected by the main hall element for the rotor section is the first signa, and when the rotor section undergoes polarity reversal at the secondary hall element, a polarity signal of the rotor section detected by the secondary hall element is the second signal.

3. The single-phase motor with positive and negative turn detection as claimed in claim 2, wherein, the control assembly further compares the first signal with the second signal to determine a rotation direction of the rotor assembly.

4. The single-phase motor with positive and negative turn detection as claimed in claim 3, wherein, if the first signal is same as the second signal, the rotor assembly rotates in the clockwise direction; if the first signal is different from the second signal, the rotor assembly rotates in the counter clockwise direction.

5. The single-phase motor with positive and negative turn detection as claimed in claim 1, wherein, when the single-phase motor with positive and negative turn detection starts in the jitter dead angle, the third signal is a polarity of one of the rotor sections detected by the master hall element, and the fourth signal is a polarity of one of the rotor sections detected by the secondary hall element.

6. The single-phase motor with positive and negative turn detection as claimed in claim 5, wherein, if the polarity of the magnetic strip in the third signal is alternately changed, and the polarity of the magnetic strip in the fourth signal remasters unchanged, the control assembly detects the single-phase motor with positive and negative turn detection working abnormally and adjusting operations of the single-phase motor with positive and negative turn detection;

if the polarity of the magnetic strip in the third signal is alternately changed, and the polarity of the magnetic strip in the fourth signal is alternately changed, the control assembly detects the single-phase motor with positive and negative turn detection works normally and controlling the single-phase motor with positive and negative turn detection to keep working.

7. The single-phase motor with positive and negative turn detection as claimed in claim 1, wherein, the magnetic end comprises a first end part and a second end part, the second end part is connected to a side of the first end part toward the counter clockwise direction, and the master hall element is arranged on the first end part.

8. The single-phase motor with positive and negative turn detection as claimed in claim 7, wherein, a thickness of the first end part is greater than a thickness of the second end part, a spacing between the first end part and the magnetic ring is less than a spacing between the second end part and the magnetic ring.

9. The single-phase motor with positive and negative turn detection as claimed in claim 1, wherein, the stator further comprises a plurality of connecting parts, the plurality of connecting parts are arranged around the central axis with equal spacing, and the plurality of connecting parts are arranged one-to-one corresponding to the plurality of stator magnetic ends.

10. The single-phase motor with positive and negative turn detection as claimed in claim 9, wherein, one end of the plurality of connecting parts close to the central axis is connected with each other, and one end of the plurality of connecting parts far from the central axis is connected with the magnetic end.

11. The single-phase motor with positive and negative turn detection as claimed in claim 10, wherein, the single-phase motor with positive and negative turn detection further comprises a plurality of coils, the plurality of coils and the plurality of connecting parts are arranged accordingly, the coil is wound around a periphery of the connecting part, and when the coil is energized, the coil is used to polarize the magnetic end.

12. The single-phase motor with positive and negative turn detection as claimed in claim 11, wherein, polarities of the adjacent two stator magnetic ends are opposite, when a polarity of one of the plurality of stator magnetic ends is the same as a polarity of one of the rotor sections located on a side of the magnetic end away from the central axis, the rotor assembly rotates in the clockwise direction.

13. The single-phase motor with positive and negative turn detection as claimed in claim 11, wherein, polarities of the adjacent two stator magnetic ends are opposite, when a polarity of the magnetic end is opposite to a polarity of one of the rotor sections located on a side of one of the plurality of stator magnetic ends away from the central axis, the rotor assembly rotates in the counter clockwise direction.

* * * * *